(12) United States Patent
Wilson

(10) Patent No.: US 7,887,104 B1
(45) Date of Patent: Feb. 15, 2011

(54) QUICK CONNECT AND DISCONNECT COUPLER

(76) Inventor: Hollis Wilson, 3923 W. 58th Pl., Los Angeles, CA (US) 90043

( * ) Notice: Subject to any disclaimer, the term of this patent is extended or adjusted under 35 U.S.C. 154(b) by 1000 days.

(21) Appl. No.: 11/595,734

(22) Filed: Nov. 10, 2006

Related U.S. Application Data

(63) Continuation-in-part of application No. 10/918,798, filed on Aug. 16, 2004, now abandoned.

(51) Int. Cl.
*F16L 23/00* (2006.01)
*F16L 37/22* (2006.01)

(52) U.S. Cl. .......... 285/414; 285/148.21; 285/316; 285/415; 285/38

(58) Field of Classification Search .......... 285/1, 285/33, 38, 148.19, 148.21, 148.2, 148.4, 285/276, 315, 316, 405, 414, 415
See application file for complete search history.

(56) References Cited

U.S. PATENT DOCUMENTS

| | | | | |
|---|---|---|---|---|
| 1,910,706 A | * | 5/1933 | Malzard | 285/314 |
| 3,565,078 A | | 2/1971 | Livingston et al. | |
| 3,997,196 A | * | 12/1976 | Karcher et al. | 285/86 |
| 4,139,222 A | * | 2/1979 | Loland | 285/27 |
| 4,198,080 A | | 4/1980 | Carpenter | |
| 4,269,226 A | * | 5/1981 | Allread | 137/614 |
| 4,275,907 A | | 6/1981 | Hunt | |
| 4,338,933 A | | 7/1982 | Bayard et al. | |
| 5,076,324 A | | 12/1991 | Herman et al. | |
| 5,255,714 A | * | 10/1993 | Mullins | 137/614.04 |
| 5,353,837 A | | 10/1994 | Faust | |
| 5,462,316 A | * | 10/1995 | Street et al. | 285/81 |
| 5,683,115 A | * | 11/1997 | Hill | 285/2 |
| 5,816,621 A | | 10/1998 | Frost | |
| 6,131,961 A | * | 10/2000 | Heilmann | 285/316 |
| 6,561,551 B2 | * | 5/2003 | Kawakami et al. | 285/316 |
| 7,387,320 B2 | * | 6/2008 | Kozey | 285/360 |
| 2002/0149200 A1 | * | 10/2002 | Fumioka | 285/81 |
| 2008/0001395 A1 | * | 1/2008 | Kouda | 285/33 |

\* cited by examiner

*Primary Examiner*—James M Hewitt
(74) *Attorney, Agent, or Firm*—Albert O. Cota

(57) ABSTRACT

A quick connect and disconnect coupler (QCDC) having a coupler plug and a coupler socket. The coupler plug has an input that is connected to a fluid source and an output. The coupler socket has an input that is connected to the coupler plug's output, and an output that is connected to a hose from where the fluid is applied to a fire. The coupler socket features a front and rear gripping flange that together allow a person to safely, quickly, and easily attach the coupler socket to the coupler plug. The QCDC also features a safety lock that is normally in a locked position, which prevents the socket from being attached or detached to and from the plug. The safety lock is released from its locked position only after a determination has been made that it is safe to attach or detach the coupler socket from the coupler plug.

8 Claims, 7 Drawing Sheets

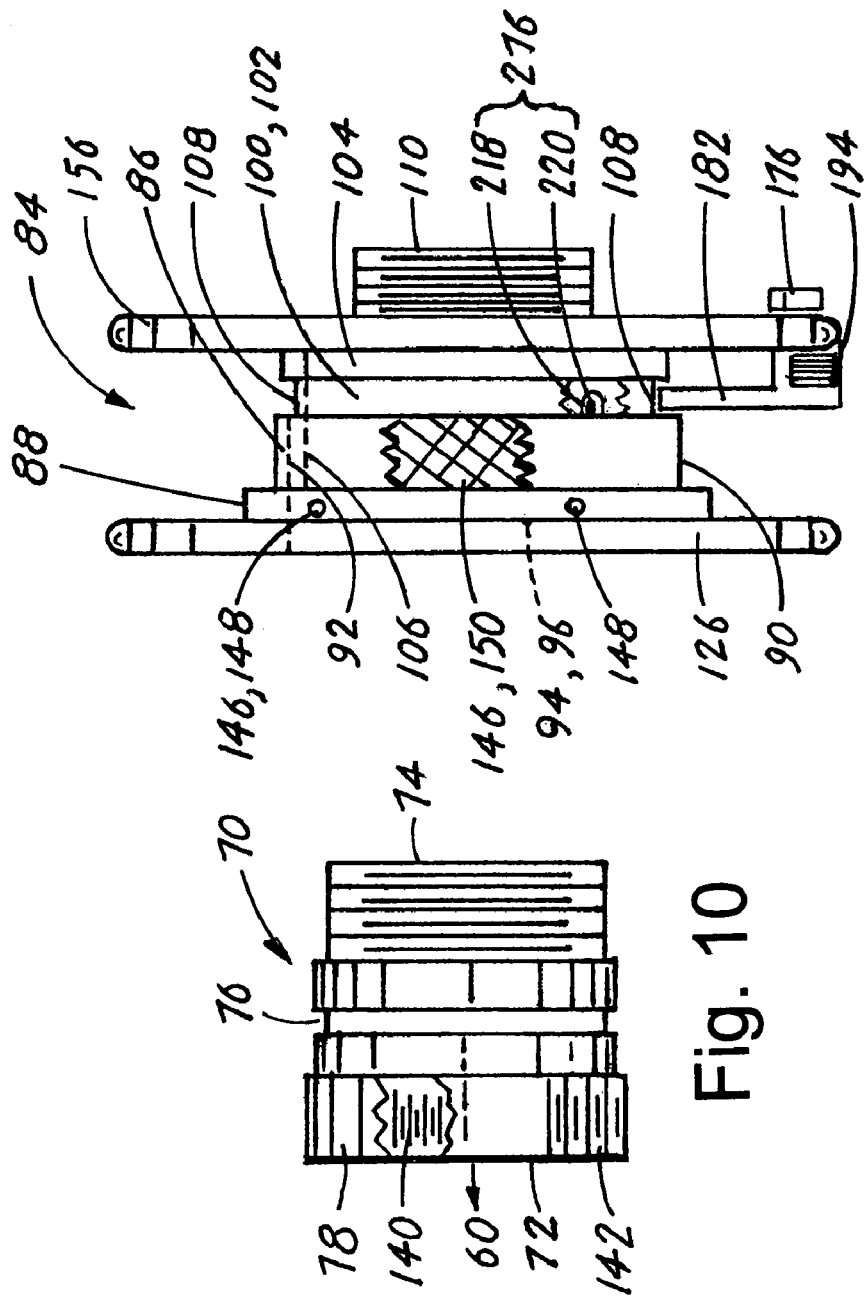

QUICK CONNECT AND DISCONNECT COUPLER

This application is a continuation-in-part of application Ser. No. 10/918,798 filed Aug. 16, 2004 now abandoned.

TECHNICAL FIELD

The invention generally pertains to the field of conduit couplers, and more particularly to a conduit coupler consisting of a coupler socket that:

1. is safely, easily and quickly attached and detached to a coupler plug by utilizing a pair of gripping flanges, and
2. includes a safety lock that must be disengaged before the coupler socket can be attached or detached to and from a coupler plug.

BACKGROUND ART

There are many applications that require the use of a device to attach a length of hose to a fluid or particulate matter source. While there are certain applications where the hose can be simply screwed onto a fluid source, such as a garden hose and a residential water supply, there are other applications which require higher pressure therefore a more substantial interface between the hose and the source.

One of the most widely used devices to provide a strong and secure interface, and that can be quickly attached and detached, is a quick connect and disconnect coupler. A typical quick connect and disconnect coupler consists of two elements: a coupler plug and a coupler socket. The coupler plug is attached to the fluid or particulate matter source, and the coupler socket is attached to the hose. The coupler socket includes a pull-release mechanism that when pulled back, allows the coupler socket to be inserted into the coupler plug. Once the coupler socket is within the coupler plug, the pull-release mechanism is released, which secures the socket coupler to the socket plug.

A deterrent to using the typical quick connect and disconnect coupler is that in order to pull back the pull-release mechanism, a person must apply a secure grip on the mechanism, pull it back and then hold it in the "open" position until the coupler socket is attached or detached from the coupler plug. Acquiring a secure grip on the pull-release mechanism is often difficult for several reasons, including the size of the coupler socket, the size of a person's hands, and the person's strength relative to the force that is required to pull back the mechanism. Additionally, due to the high commercial water pressure, if a safety lock is not included in the coupler socket an injury can result when the coupler socket is detached from the coupler plug. The safety lock is released only after the person using the coupler has determined that it is safe to proceed with the detachment of the coupler socket.

Obviously, if there were a means by which a person could acquire a better grip on a coupler's pull-release mechanism, the attachment and detachment of the coupler socket to and from the coupler plug could be accomplished more easily, safely and quicker.

A search of the prior art did not disclose any literature or patents that read directly on the claims of the instant invention. However, the following U.S. patents are considered related:

| U.S. Pat. No. | INVENTOR | ISSUED |
|---|---|---|
| 5,353,837 | Faust | Oct. 11, 1994 |
| 5,076,324 | Herman et al | Dec. 31, 1991 |
| 4,275,907 | Hunt | Jun. 30, 1981 |
| 4,198,080 | Carpenter | Apr. 15, 1980 |

The U.S. Pat. No. 5,353,837 discloses a normally-closed valve that can be easily connected and disconnected. Disposed through the valve is a cylindrical member that is moved between an open position and a closed position. A spring holds the cylindrical member in the closed position, and a leur-type cannula is inserted into the valve to push the cylindrical member into the open position.

The U.S. Pat. No. 5,076,324 discloses a quick disconnect coupling which includes a housing having an independently displaced depressor, a sliding sleeve mounted on one end of the housing, ball bearings and a locking means that prevents the removal of the quick disconnect coupling. The quick disconnect coupling is attached to a valve without establishing communication therethrough or through the quick disconnect coupling until the depressor is independently moved into contact with the core of the valve.

The U.S. Pat. No. 4,275,907 discloses a quick-connect, manually separable fluid conduit coupling. The coupling includes a tubular male member having a tapered forward portion, a sealable bearing surface, and a radially inward-directed shoulder. The shoulder is adjacent to the rearward part of the forward portion and adjoins a recessed circumference. A sleeve includes substantially parallel, circumferentially disposed fingers and radially inward-extending lips on the fingers. The fingers have latching surfaces for automatically snapping behind and grasping the shoulder of the tubular male member upon assembly.

The U.S. Pat. No. 4,198,080 discloses a telescoping-type connector having outer and inner telescoping members. The inner telescoping member includes an outer circumferential groove that is adapted to fit in a telescoping relation within an aperture of the outer telescoping member. The outer telescoping member includes a retention means that releasably projects into the outer circumferential groove to retain the inner and outer telescoping members in the desired telescoping relation.

For background purposes and as indicative of the art to which the invention relates, reference may be made to the following remaining patents found in the search:

| U.S. Pat. No. | INVENTOR | ISSUED |
|---|---|---|
| 5,816,621 | Frost | Oct. 6, 1998 |
| 4,338,933 | Baynard, et al | Jul. 13, 1981 |
| 3,565,078 | Livingston, et al | Feb. 23, 1971 |

DISCLOSURE OF THE INVENTION

The quick connect and disconnect coupler disclosed herein is designed to safely, easily and quickly connect two conduits. The quick connect and disconnect coupler is comprised of a coupler socket and a coupler plug. The coupler plug has an input that is connected to a fluid or particulate matter source and an output. The coupler socket has an input that is connected to the output of the coupler plug, and an output that is connected to a hose from where the fluid or particulate matter is applied to the problem area such as a fire. The coupler socket comprises a pull and release mechanism that allows the coupler socket to interface with and be securely attached to the coupler plug. Extending from an outer surface of the coupler socket is a front gripping flange and a rear gripping flange. The two flanges allow a person using the coupler to obtain a better grip on the coupler socket and provides an easier means for pulling back the pull-release mechanism when attaching or detaching the coupler socket to and from the coupler plug.

The inventive design also includes a safety lock that prevents the coupler socket from being attached to or detached from the coupler plug until a determination is made by the user of the coupler socket that it is safe to operate the inventive coupler.

With a conventional coupler, a person must grip the pull-release mechanism by encircling their hand or hands around the outer surface of the pull-release mechanism. This can be difficult to perform and often requires substantial strength to pull back the pull-release mechanism.

With the inclusion of the front and rear flanges, a person can grip the flanges and apply a force to pull back the pull-release mechanism, which is much safer, easier and quicker than pulling back the pull-release mechanism on a conventional coupler.

In view of the above disclosure, the primary object of the invention is to provide a quick connect and disconnect coupler having a pair of gripping flanges that facilitate the attachment and detachment of the coupler's pull-release mechanism and that includes a safety lock that must be disabled before the coupler socket can be attached to or detached from the coupler plug.

It is also an object of the invention to provide a coupler that:
can be utilized for the transfer of a fluid as well as particulate matter,
is easier, quicker and safer to use,
saves time especially when attaching the coupler socket to the coupler plug,
is applicable for use on fire trucks, gasoline trucks, refueling trucks, high volume liquid transfer pumps, and the like,
is ideal for high-pressure water or a steam washer,
can be constructed of various materials and sizes, and
is cost effective from both a manufacturer's and consumer's point of view.

These and other objects and advantages of the present invention will become apparent from the subsequent detailed description of the preferred embodiment and the appended claims taken in conjunction with the accompanying drawings.

BRIEF DESCRIPTION OF THE DRAWINGS

The first embodiment of the QCDC is shown in FIGS. 1-9 and the second embodiment of the QCDC is shown in FIGS. 10-18.

FIG. 10 is a side elevational view of a coupler plug.

FIG. 11 is a side elevational view of a coupler socket showing the placement of a first and a second gripping flange.

FIG. 12 is a side elevational view of hose connector that attaches to the output of the coupler socket.

BEST MODE FOR CARRYING OUT THE INVENTION

Figure 1:
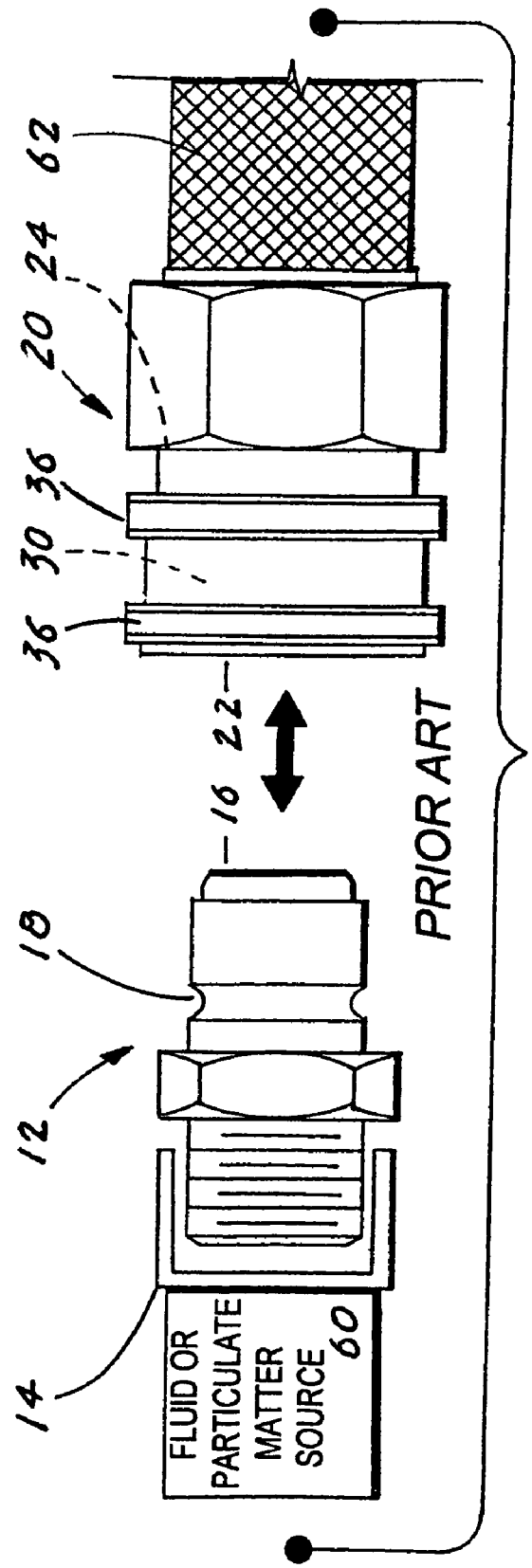
FIG. 1 is a side elevational view of a typical prior art quick connect and disconnect coupler consisting of a coupler plug and a coupler socket. The coupler plug has an input and an output, the input is shown connected to a fluid or particulate matter source. The coupler socket has an input that connects to the output of the coupler socket, and an output that is connected to a hose.

The best mode for carrying out the invention is presented in terms of a first embodiment and a second embodiment for a quick connect and disconnect coupler 10 that is to connect two conduits, (hereinafter "the QCDC 10"). A conventional prior art quick connect and disconnect coupler, as shown in FIG. 1, utilizes a design that requires a person to place their hand or hands around a coupler socket in order to pull the coupler back and thereby attach or detach the coupler socket to and from a coupler plug. Depending on the size of the coupler and on the person's strength, the act of attaching or detaching a socket coupler from the coupler plug can be problematic.

The QCDC 10 offers a solution to this problem by providing two gripping flanges that are attached to the coupler socket. The two flanges allow a person to achieve a much better grip on the coupler socket, which provides a safer and faster means for attaching and detaching the coupler socket to and from the coupler plug.

The first embodiment of the QCDC 10, as shown in FIGS. 1-9, is comprised of two major elements: a coupler plug 12 and a coupler socket 20. The two elements can be made of a material that includes a metal, such as stainless steel and aluminum, a composite material or plastic.

The prior art coupler plug 12, and the coupler socket 20, are shown in FIG. 1. The plug 12 has an input 14 and an output 16. Between the input 14 and the output 16 is located a circumferential slot 18 that functions to lock the coupler socket 20. The input 14 includes a means for attaching the input 14 to a fluid or a particulate matter source 60. The coupler socket 20 has an input 22 and an output 24. The input 22 is connected to the output 16 of the plug 12 and the output 24 is connected to a hose 62. The coupler also includes a pull-release mechanism 30 and a pair of hand grasping protrusions 36.

Figure 3:
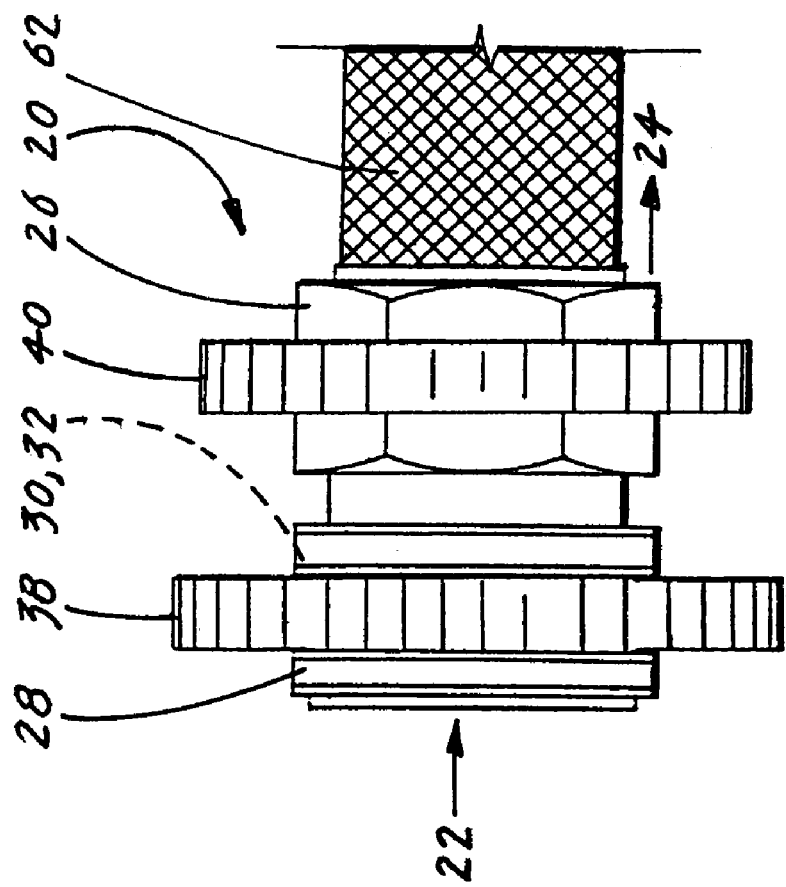
FIG. 3 is a side elevational view of the coupler socket shown in FIG. 2.
Figure 2:
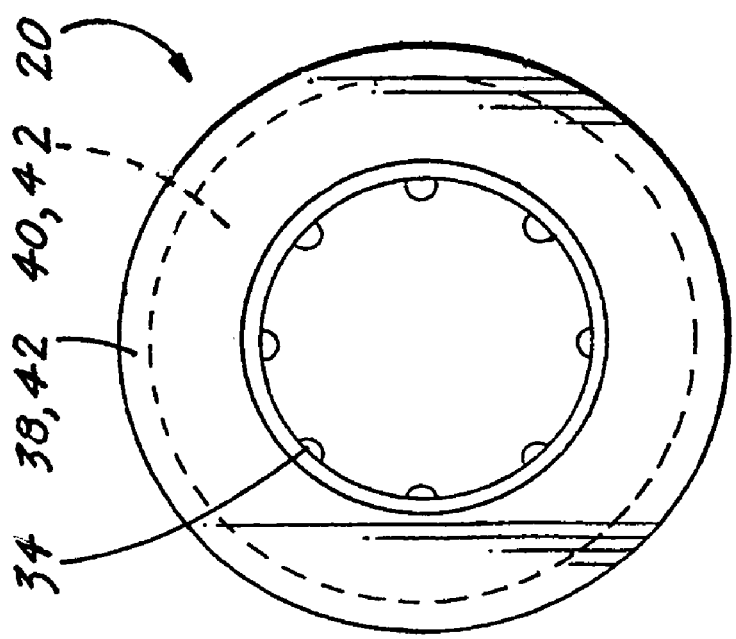
FIG. 2 is a front elevational view of a coupler socket having circular front and rear gripping flanges.

The first embodiment of the inventive coupler socket 20, as shown in FIGS. 2 and 3, has an input 22 and an output 24 that is connected to a hose 62. The socket 20 further has a stationary section 26, a movable section 28, a pull-release mechanism 30, a front gripping flange 38 and a rear gripping flange 40. The pull-release mechanism 30 is enclosed within the movable section 28 and has means for allowing the coupler socket 20 to be attached to and detached from the output 16 of the coupler plug 12. In a preferred implementation, the pull-release mechanism 30 is comprised of a spring 32 that keeps the stationary section 26 separated from the movable section 28, and a plurality of ball bearings 34. When the movable section 28 is pulled backward, by means of the front and rear gripping flanges 38,40, a plurality of ball bearings 34 located within the coupler socket 20 disengage from their stationary position. When the ball bearings 34 disengage, the coupler socket can be attached or detached from the coupler plug 12.

The combination of the front gripping flange 38 and the rear gripping flange 40, as shown in FIGS. 2 and 3, allows a person to easily, comfortably and securely grip the QCDC 10 when attaching or detaching the coupler socket 20 to and from the coupler plug 12. When utilizing the two gripping flanges, a person utilizing the QCDC 10 places their fingers on the front gripping flange 38 and uses the rear gripping flange 40 as a brace for the person's thumbs and/or palms.

Figure 4:
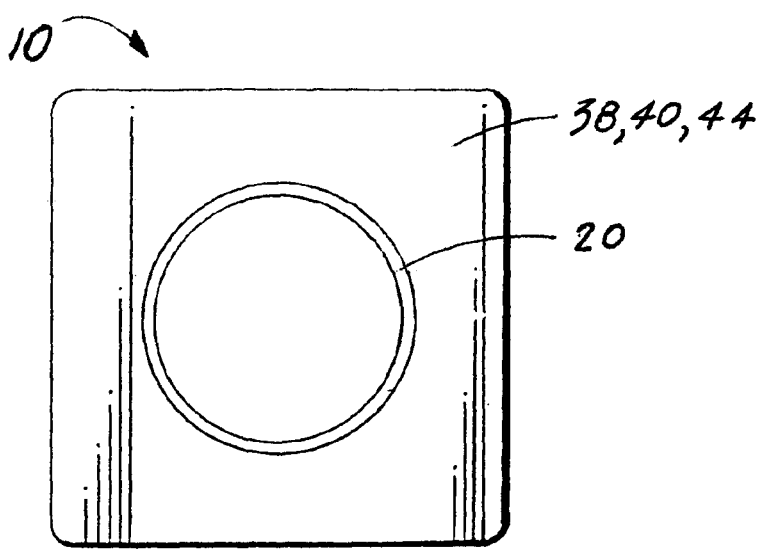
FIG. 4 is a side elevational view of a coupler socket having square gripping flanges.
Figure 5:
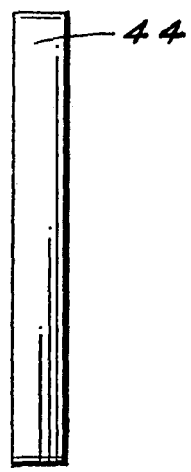
FIG. 5 is a side elevational view of one of the square flanges as shown in FIG. 5.
Figure 6:
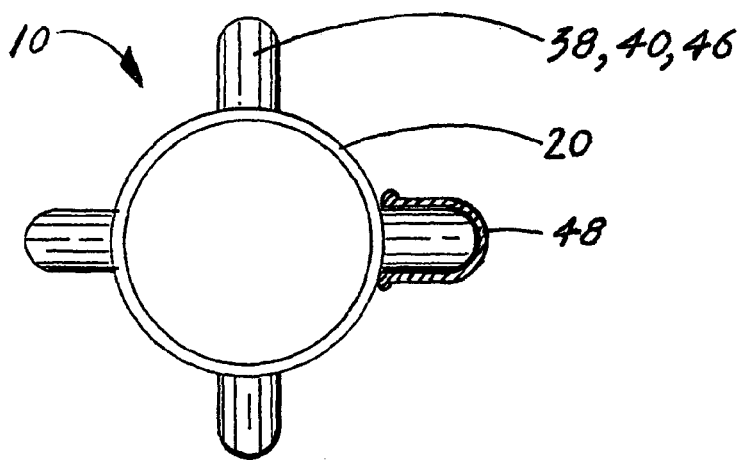
FIG. 6 is a front elevational view of a coupler socket having gripping flanges consisting of at least two (four shown) U-shaped tabs. One of the tabs is shown with an optional resilient sheath over a tab.
Figure 7:
FIG. 7 is a side elevational view of one of the U-shape tabs as shown in FIG. 6.

The front and rear gripping flanges 38,40 are preferably comprised of circular flanges 42, as shown in FIGS. 2 and 3. The rear gripping flange 40 can have a height that is greater than, less than or equal to the height of the front gripping flange 38. A rear gripping flange 40 having a height that is less than the front gripping flange 38 is shown in FIGS. 2 and 3. The two gripping flanges 38,40 can also be configured to have square flanges 44, as shown in FIGS. 4 and 5, or U-shaped tabs 46, as shown in FIGS. 6 and 7. To add further utility to the QCDC 10, the flanges can be dipped in a resilient material, such as rubber, or a resilient sheath 48, as shown in FIG. 6, can be placed over the tabs 46.

Figure 8:
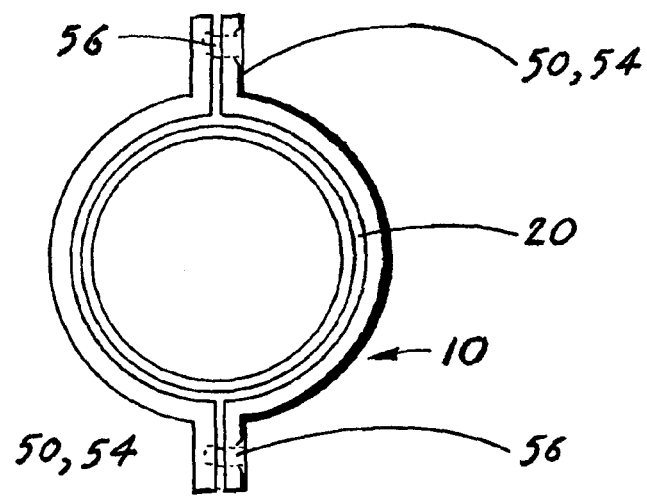
FIG. 8 is a front elevational view of a coupler socket having a gripping flange consisting of two sections that are bolted together to form a pair of rectangular gripping tabs.
Figure 9:
FIG. 9 is a top plan view of one of the rectangular tabs shown in FIG. 8.

Additionally, a further design configuration of the QCDC 10 utilizes a gripping flange that is comprised of a pair of removably attached bands 50, as shown in FIG. 8. The bands 50 are designed to allow a person to attach a gripping flange onto any conventional coupler. The removably attached bands 50 can be comprised of several designs, including two removable bands 50 that are attached by means of bolts 56 to form a pair of rectangular tabs 54, as shown in FIGS. 8 and 9. In another design (not shown) the gripping flange consists of two sections, with one end having a hinge and the opposite end bolted together to form a pair of rectangular tabs 54.

The second embodiment of the QCDC 10, as shown in FIGS. 10-18, is also comprised of two major elements: a coupler plug 70 and a coupler socket 84.

The coupler plug 70, as shown in FIG. 10, is comprised of an input 72, an output 74, a circumferential slot 76 that is located between the input 72 and the output 74, and a means 78 for attaching the input 72 to a fluid or a particulate matter source 60, which is shown in FIG. 1. The circumferential slot 76 functions to receive and maintain the coupler socket 84 as described infra. The means 78 for attaching the input 72 to the fluid or particulate matter 60 can consist of the input 72 having a set of female threads 140 that interface with a corresponding set of male threads on the source 60. Alternatively, the input 72 can have a set of male threads 142 that interface with a corresponding set of female threads on the source 60.

The coupler socket 84, as shown in FIG. 11, is comprised of a collar 86, a coupling sleeve 100, a means for attaching and detaching the coupler socket 84 from the coupler plug 70, a front gripping flange 126, a rear gripping flange 156, and a means for locking and unlocking the coupler socket 84 to and from the coupler plug 70.

The collar 86 has a central opening 92 and a front raised rim 88 that is integrally attached to the rear section 90 of the collar 86.

The coupling sleeve 100, as also shown in FIG. 11, has a front section 102, a rear raised rim 104 and a central opening 106. The front section 102 is dimensioned to be inserted into the central opening 92 on the collar 86 and is retained therein by a retaining clip 94. The clip 94 is inserted into a clip groove 96 that is located on the forward end of the collar 86. When the coupling sleeve 100 is inserted, a lock slot 108 remains between the interface of the collar 86 and the coupling sleeve 100. The purpose of the lock slot 108 is described infra. The rear raised rim 104 terminates in an integral threaded section 110, as shown in FIG. 11, which interfaces with a corresponding threaded connector 116, as shown in FIG. 12, that is attached to a hose 118. From the hose the fluid or particulate matter 60 is applied to a problem area such as a fire.

The means for attaching and detaching the coupler socket 84 to and from the coupler plug 70 is accomplished by utilizing a pull-release mechanism 146 in combination with a front gripping flange 126 and a rear gripping flange 156. The pull-release mechanism 146 is comprised of a plurality of ball bearings 148 and a spring 150 such as a wave spring.

The plurality of ball bearings 148 protrude from an inner surface of the coupling sleeve 100 and interface with the circumferential slot 76 on the coupler plug 70. The spring 150 is located around the rear section of the collar 86 and functions to maintain the coupler socket 84 locked to the coupler plug 70. The collar 86 with the spring 150, as shown in 86, is located between the front raised rim 88 that interfaces with the front gripping flange 126 and the coupling sleeve 100. The coupling sleeve 100 interfaces with the rear raised rim 104 that interfaces with the rear gripping flange 156. To detach the coupler socket 84 from the coupler plug 70, the front flange 126 is pulled inward, which causes the plurality of ball bearings 148 to retract and disengage from the circumferential slot 76 on the coupler plug 70 which then allows the coupler socket 84 to be attached or detached from the coupler plug 70.

Figures 13, 14:
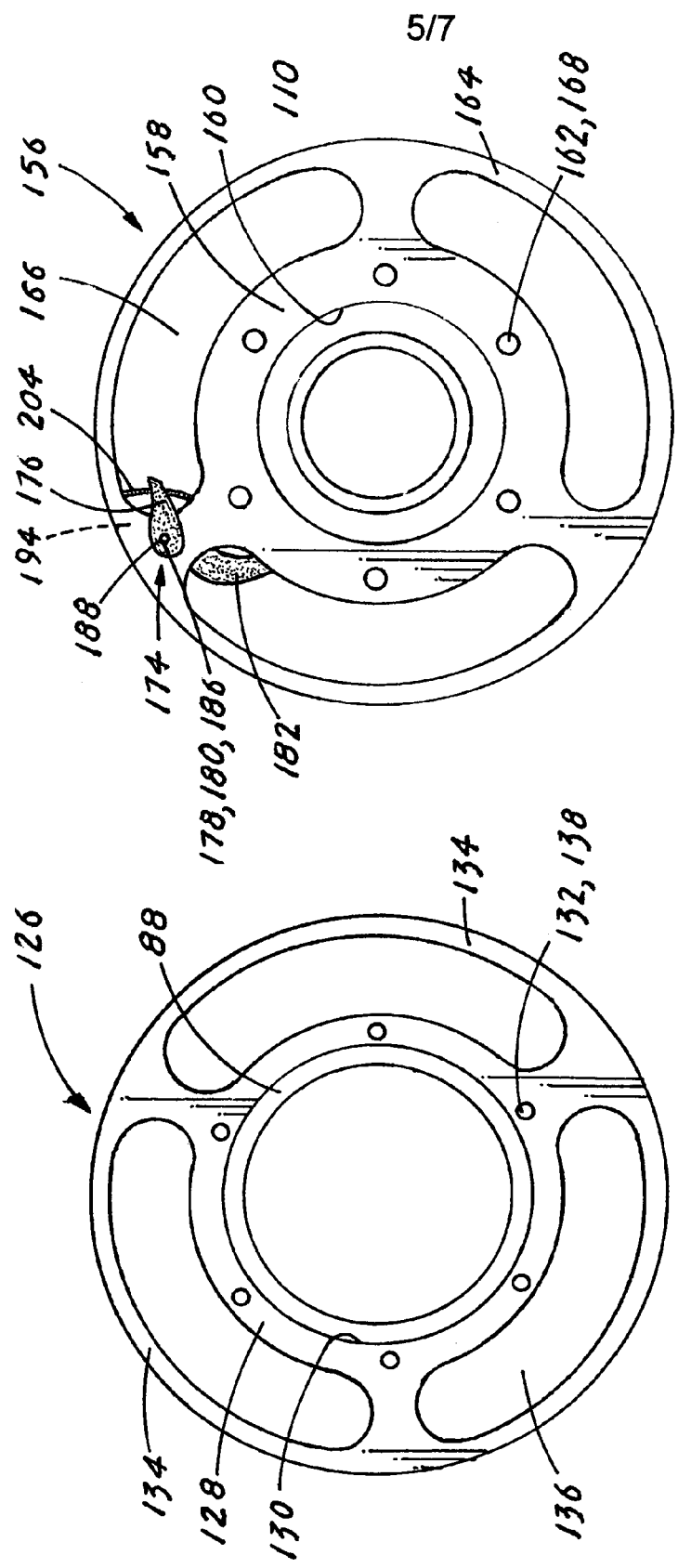
FIG. 13 is an elevational view of a front gripping flange shown from the surface that faces the rear gripping flange.
FIG. 14 is a front elevational view of a rear gripping flange showing the location of a safety lock.

The front gripping flange 126, as shown from the side in FIG. 11 and from the surface that faces the rear gripping flange 156 in FIG. 13, is comprised of a central section 128 having an opening 130 and a plurality of bolt bores 132, and an outer gripping section 134, as best shown in FIG. 13. The section 134 is integrally separated from the central section 128 by a plurality of elongated openings 136 that function as hand grips. The front gripping flange 126 is removably attached to the front raised rim 88 of the collar 86, as shown in FIG. 11, by a plurality of threaded bolts 138. The bolts 138 are inserted into the plurality of bolt bores 132 located on the central section 128 and into the plurality of threaded bores 89 located on the front raised rim 88.

The rear gripping flange 156, as shown in FIGS. 11 and 14, is comprised of a central section 158 having an opening 160 and a plurality of bolt bores 162, and an outer gripping section 164, as best shown in FIG. 14. The section 164 is integrally separated from the central section 158 by a plurality of elongated openings 166 that function as hand grips. The outer gripping section 164 is removably attached to the rear raised rim 104 of the coupling sleeve 100 by a plurality of threaded bolts 168 that are inserted into the plurality of bolt bores 162 and into a plurality of threaded bolt bores 101 located on the front section of the coupling sleeve 100. The combination of the front and rear gripping flanges 126,156 allow a person to easily and securely grip the QCDC 10 when attaching or detaching the coupler socket 84 to and from the coupler plug 70. Additionally, in the event that either the front or rear gripping flanges are damaged, they can be easily removed and replaced by means of their respective threaded bolts 138,168.

Figure 15:
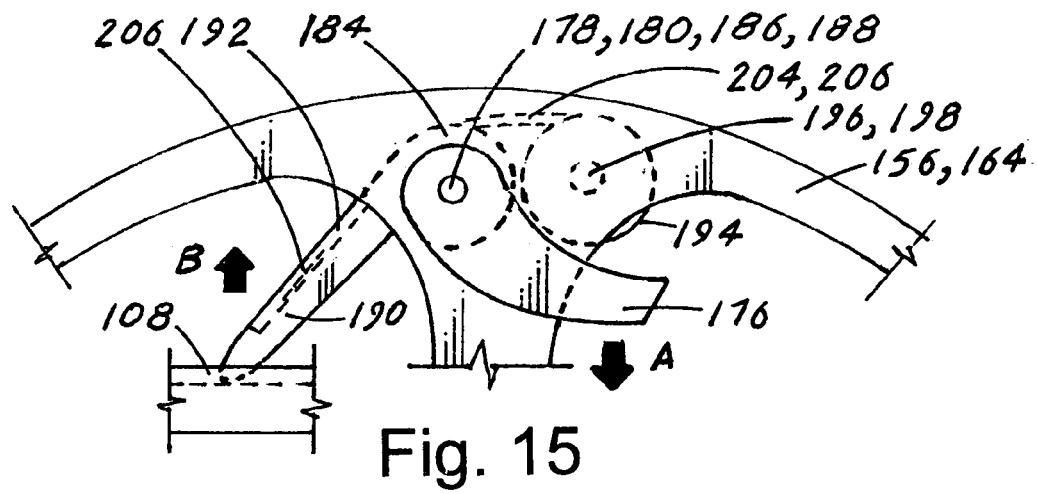
FIG. 15 is an enlarged side elevational view of the safety lock as viewed from the front of the rear gripping flange.
Figure 16:
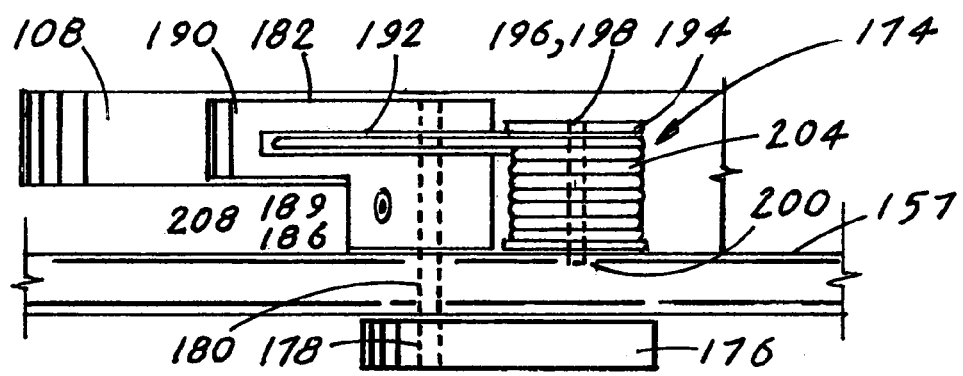
FIG. 16 is an enlarged top plan view of the safety lock.
Figure 17:
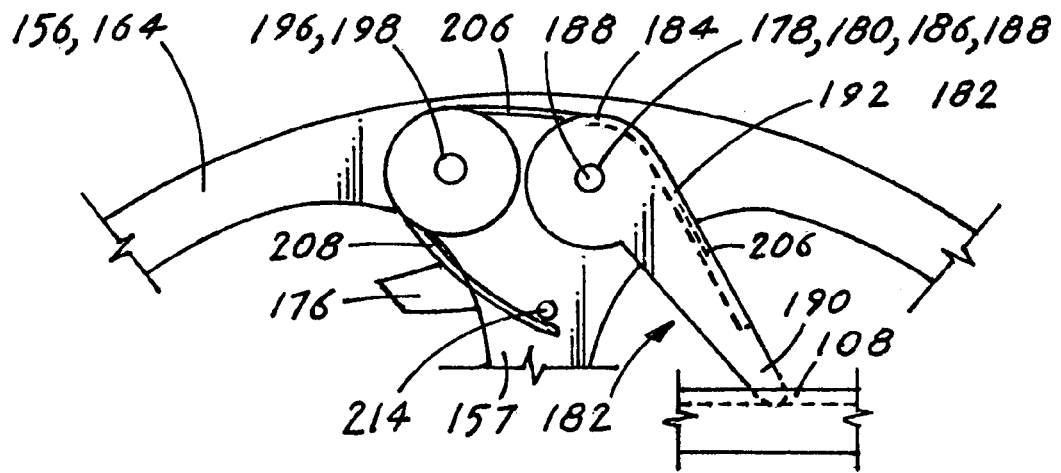
FIG. 17 is an enlarged side elevational view of the safety lock as viewed from the rear of the rear gripping flange.

In accordance with OSHA regulations and general safety practices, the QCDC 10 is designed to include a safety lock 174, as shown in FIGS. 15-18. The safety lock 174 is normally in a locked position, as shown in FIGS. 15-17, in which position, the coupler socket 84 cannot be disengaged from the coupler plug 70. Before the safety lock 174 is manually released, the operator of the QCDC 10 must determine that it is safe to detach the coupler socket 84 from the coupler plug 70.

The safety lock 174 is comprised of a finger-actuated pivot structure 176, a pivoting locking structure 182, a spring-retaining spool 194 and a spring 204. The above elements operate in combination with the lock slot 108 that is formed between the interface of the collar 86 and the coupling sleeve 100.

The finger-actuated pivot structure 176, as shown in FIGS. 15-17, movably extends outward from an outer surface and is adjacent to the outer gripping section 164 of the rear flange 156. The pivot structure 176 has a first rod bore 178 that is in alignment with a second rod bore 180 that is located on the rear flange 156.

The pivoting locking structure 182, which functions in combination with the pivot structure 176, movably extends inward from an inner surface of the rear flange 156 and is adjacent to the outer gripping section 164 of the flange 156. The locking structure 182, as also shown in FIGS. 15-17, includes a first section 184 having a third rod bore 186 that is in alignment with the first rod bore 178 and the second rod bore 180. A pivot rod 188 extends through the first, second and third rod bores 178,180 and 186. The pivot rod 188 is secured by a rod lock screw 189 and functions to secure the finger-actuated pivot 176 and the pivoting locking structure 182 to the rear gripping flange 156. Integrally attached to the first section 184 is a second section 190, as best shown in FIG. 17. The second section 190 is dimensioned to be inserted into the lock slot 108, and includes an upper spring-retaining slot 192, as shown in FIG. 16.

The spring-retaining spool 194, as best shown in FIG. 16, extends outward from the outer surface of the rear gripping flange 156. The spool 194 has a fourth rod bore 196 into which is inserted a spool rod 198 that is secured to a rod cavity 200 located on the rear gripping flange 156. The spring 204, as shown in FIGS. 16 and 17, is wound around the spring-retaining spool 194, and has a first end 206 and a second end 208. The first end 206 is retained within the spring-retaining slot 192 located on the pivoting locking structure 182. The second end 208 is placed against a protrusion 214 that extends from the inner surface 157 of the rear flange 156, as shown in FIG. 17.

When the finger-actuated pivot structure 176 is depressed in the direction of arrow "A", as shown in FIG. 15, the pivoting locking structure 182 moves upward in the direction of arrow "B", as also shown in FIG. 15. When the structure 182 moves upward it is released from the lock slot 108, which then allows the coupler socket 84 to be attached or detached from the coupler plug 70.

Figure 18:
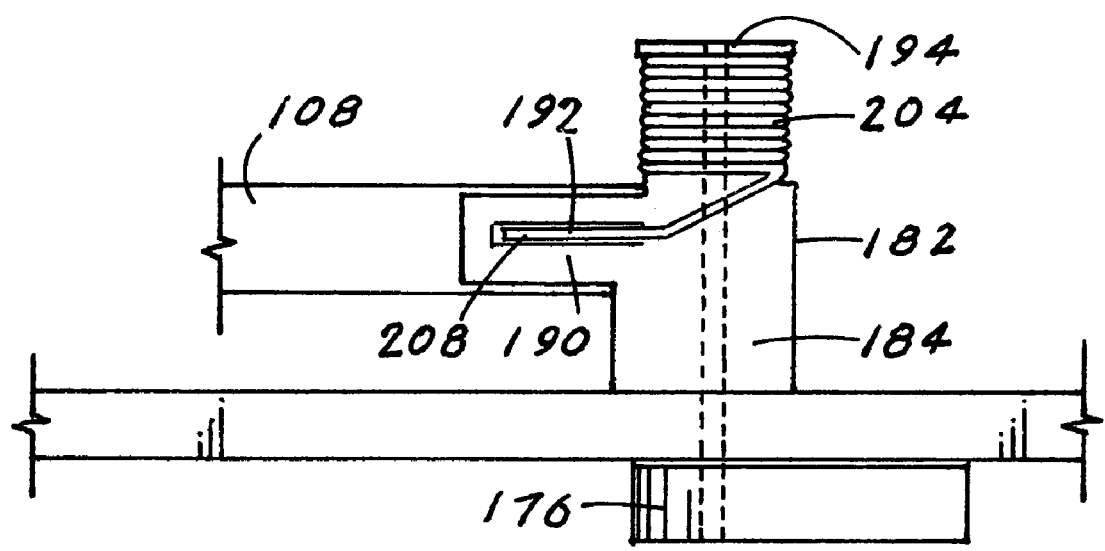
FIG. 18 is a top plan view of a safety lock that has a spring-retaining spool that is an integral part of a pivoting locking structure.

The safety lock 174, as shown in FIG. 18, can also be designed with the spring-retaining spool 194 as an integral part of the first section 184 of the pivoting locking structure 182. In this design, the second end 208 of the spring 204 is configured to fit into the spring-retaining slot 192 located on the second section of the pivoting locking structure 182.

The QCDC 10, as shown in FIG. 11, also includes at least one keyed assembly 216 that allows the collar 86 and the coupling sleeve 100 to be correctly oriented with respect to each other. The assembly 216 is comprised of at least one key slot 218 that is located on the collar 86, and at least one key 220 that is attached to the sleeve 100 and is dimensioned to fit into the key slot 218.

While the invention has been described in detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

The invention claimed is:

1. A quick connect and disconnect coupler (QCDC) that function in combination with a fluid or particulate matter source and a hose, said QCDC comprising:
   a) a coupler plug comprising:
      (1) an input and an output,
      (2) a circumferential slot located between the input and the output, and
      (3) means for attaching the input of said coupler plug to the fluid or a particulate matter source, and
   b) a coupler socket comprising:
      (1) a collar having a central opening and a front raised rim that is integrally attached to a rear section of the collar, and
      (2) a coupling sleeve having a front section, a rear raised rim and a central opening, wherein the front section is dimensioned to be inserted into the central opening on said collar and retained therein by a retaining clip that is inserted into a clip groove that is located on a forward end of the collar, wherein when said coupling sleeve is inserted into said collar, a lock slot remains that is located between the interface of said collar and said coupling sleeve, and wherein the rear raised rim terminates in an integral threaded section that interfaces with a corresponding threaded connector on the hose from where the fluid and particulate matter is delivered to a fire,
   c) means for attaching and detaching said coupler socket from said coupler plug,
   d) a front gripping flange comprising:
      (1) a central section having a central opening and a plurality of bolt bores, and
      (2) an outer gripping section that is integrally separated from the central section by a plurality of elongated openings that function as hand grips, wherein said front gripping flange is removably attached to the front raised rim of said collar by a plurality of threaded bolts that are inserted into the plurality of bolt bores located on said central section, and into a plurality of threaded bores located on the front raised rim,
   e) a rear gripping flange comprising:
      (1) a central section having an opening and a plurality of bolt bores, and
      (2) an outer gripping section that is integrally separated from the central section by a plurality of elongated openings that function as hand grips, wherein said rear gripping flange is removably attached to the rear raised rim located on the coupling sleeve by a plurality of threaded bolts that are inserted into the plurality of bolt bores on said central section, and into a plurality of bolt bores on the front section of said coupling sleeve, wherein the combination of said front and rear gripping flanges allows a person to easily and securely grip said QCDC when connecting or disconnecting said coupler socket to and from said coupler plug, and f) means for locking and unlocking said coupler socket to and from said coupler plug.

2. The quick connect and disconnect coupler as specified in claim 1 wherein said means for attaching the input of said coupler plug to the fluid or particulate matter source comprises:
 a) a set of female threads on the input of said coupler plug that interface with a corresponding set of male threads located on the source, or
 b) a set of male threads on the input of said coupler plug that interface with a set of female threads located on the source.

3. The quick connect and disconnect coupler as specified in claim 1 wherein the outer gripping section of said front and rear gripping flanges are coated with a resilient material.

4. The quick connect and disconnect coupler as specified in claim 1 wherein the outer gripping section of said front and rear flanges are covered with a resilient sheath.

5. The quick connect and disconnect coupler as specified in claim 1 wherein said means for attaching and detaching said coupler socket from said coupler plug is provided by a pull-release mechanism comprising:
 a) a plurality of ball bearings that protrude from an inner surface of said coupling sleeve, wherein said plurality of ball bearings interface with the circumferential slot on said coupler plug, and
 b) a spring that is located around the rear section of said collar, wherein said collar is located between said front raised rim that interfaces with said front gripping flange and said coupling sleeve, wherein said coupling sleeve interfaces with the rear raised rim that interfaces with said rear gripping flange, wherein said spring maintains said coupler socket locked to said coupler plug, wherein to detach said coupler socket from said coupler plug, said front gripping flange is pulled inward which causes the plurality of ball bearings to retract and disengage from the circumferential slot on said coupler plug, thereby allowing said coupler socket to be detached from said coupler plug.

6. The quick and disconnect coupler as specified in claim 1 wherein said means for locking and unlocking said coupler socket to and from said coupler plug comprises a safety lock that functions in combination with the lock slot that is formed between the interface of said collar and said coupling sleeve, said safety lock comprising:
 a) a finger-actuated pivot structure that movably extends outward from the outer surface and adjacent to the outer gripping section of said rear gripping flange, said pivot structure having a first rod bore that is in alignment with a second rod bore on said rear gripping flange,
 b) a pivoting locking structure that movably extends inward from the inner surface and is adjacent to the outer gripping section of said rear gripping flange, said locking structure further comprising:
  (1) a first section having a third rod bore that is in alignment with the first and second rod bores,
  (2) a pivot rod that extends through the first, second and third rod bores, wherein said pivot rod is secured by a rod lock screw and functions to secure said finger-actuated pivot and said pivoting locking structure to said rear flange,
  (3) a second section integral with said first section and that is dimensioned to be inserted into the lock slot and having an upper spring-retaining slot,
 c) a spring-retaining spool that extends outward from the outer surface of said rear flange, wherein said spool having a fourth rod bore into which is inserted a spool rod that is secured to a rod cavity located on said rear flange, and
 d) a spring that is wound around said spring-retaining spool, said spring having a first end and a second end, wherein the first end is retained within the spring-retaining slot, and wherein the second end is placed against a protrusion that extends from the inner surface of said rear flange, wherein when the finger-actuated pivot structure is depressed, said pivoting locking structure is released from the spring-retaining slot, which then allows said coupler socket to be attached or detached from the coupler plug.

7. The quick connect and disconnect coupler as specified in claim 6 wherein said spring-retaining spool is an integral part of the first section of said pivoting locking structure, wherein said spring is configured to fit into the spring retaining slot located on said pivoting locking structure.

8. The quick connect and disconnect coupler as specified in claim 1 further comprising at least one keyed assembly that allows said collar and said sleeve to be correctly oriented with respect to each other, said assembly having:
 a) at least one slot that is located on said collar, and
 b) at least one key that is attached to said sleeve and that is dimensioned to fit into said slot.

* * * * *